Dec. 11, 1962 L. J. OKONEK 3,067,889
METHOD FOR HANDLING MEAT CARCASSES
Filed Sept. 13, 1960 2 Sheets-Sheet 1

Leonard J. Okonek
INVENTOR.

Dec. 11, 1962 L. J. OKONEK 3,067,889
METHOD FOR HANDLING MEAT CARCASSES
Filed Sept. 13, 1960 2 Sheets-Sheet 2

Leonard J. Okonek
INVENTOR.

BY Clarence A. O'Brien
and Harvey B. Jacobson
Attorneys 3,067,889
Patented Dec. 11, 1962

3,067,889
METHOD FOR HANDLING MEAT CARCASSES
Leonard J. Okonek, 109 S. Minnesota Ave.,
Stevens Point, Wis.
Filed Sept. 13, 1960, Ser. No. 55,694
2 Claims. (Cl. 214—152)

The present invention generally relates to the handling of material and especially meat carcasses or portions thereof and more particularly to an improved and novel method for loading and unloading such carcasses.

In the handling of meat carcasses, it is the usual procedure that such carcasses be shipped from a meat warehouse to smaller distribution points by use of vehicles such as semi-trailers which may or may not be refrigerated. Meat carcasses in the warehouse are easily supported from overhead rails by trolleys equipped with hooks and each carcass or portion thereof is provided with an S-shaped hook engaged therewith which is correspondingly engaged with the hooks on the overhead trolley. The semi-trailer vehicle is provided with overhead supporting rails having hook members engaged therewith capable of receiving the same S-shaped hooks in the meat carcasses which originally engaged the trolley hooks in the warehouse. Conventional procedures in handling the carcasses have usually included the steps of a person lifting the carcass in the warehouse for disconnecting it from the trolley hook, transporting it from the warehouse into the interior of the load carrying body of the semi-trailer and then lifting the carcass again and engaging the hook thereon with the overhead hook supported from the overhead rails. This procedure is quite time consuming since each meat carcass has to be individually handled, and, of course, requires considerable expenditure of physical effort. While some effort has been made to motorize the loading and unloading of carcasses in a semi-trailer load carrying body, there still has been required the manual lifting of the carcass to disengage the hook from the trolley and to engage the hook on the meat carcass with the overhead hook normally provided on the semi-trailer. Therefore, it is the primary object of the present invention to provide method which enables a plurality of carcasses to be conveyed from the warehouse into the trailer or from the trailer into the warehouse with the entire loading and unloading procedure being carried out by employing a fork lift truck.

Another object of the present invention is to provide a novel method for conveying meat carcasses from one group of supporting hooks to another group of supporting hooks with the carcasses being disengaged from and engaged with the respective hooks without requiring the use of any manual labor except where normally employed in operating a fork lift truck.

Still another object of the present invention is to provide a method of handling meat carcasses which involves novel procedural steps for accomplishing the transportation of the meat carcasses in a more expeditious and efficient manner.

These together with other objects and advantages which will become subsequently apparent reside in the details of the method as more fully hereinafter described and claimed, reference being had to the accompanying drawings forming a part thereof, wherein like numerals refer to like parts throughout, and in which:

FIGURE 4 is an enlarged view of one end of the carcass handling bar; and

FIGURE 5 is a detailed sectional view taken substantially upon a plane passing along section line 5—5 of FIGURE 4 illustrating the details of construction of the bar.

Figure 1:
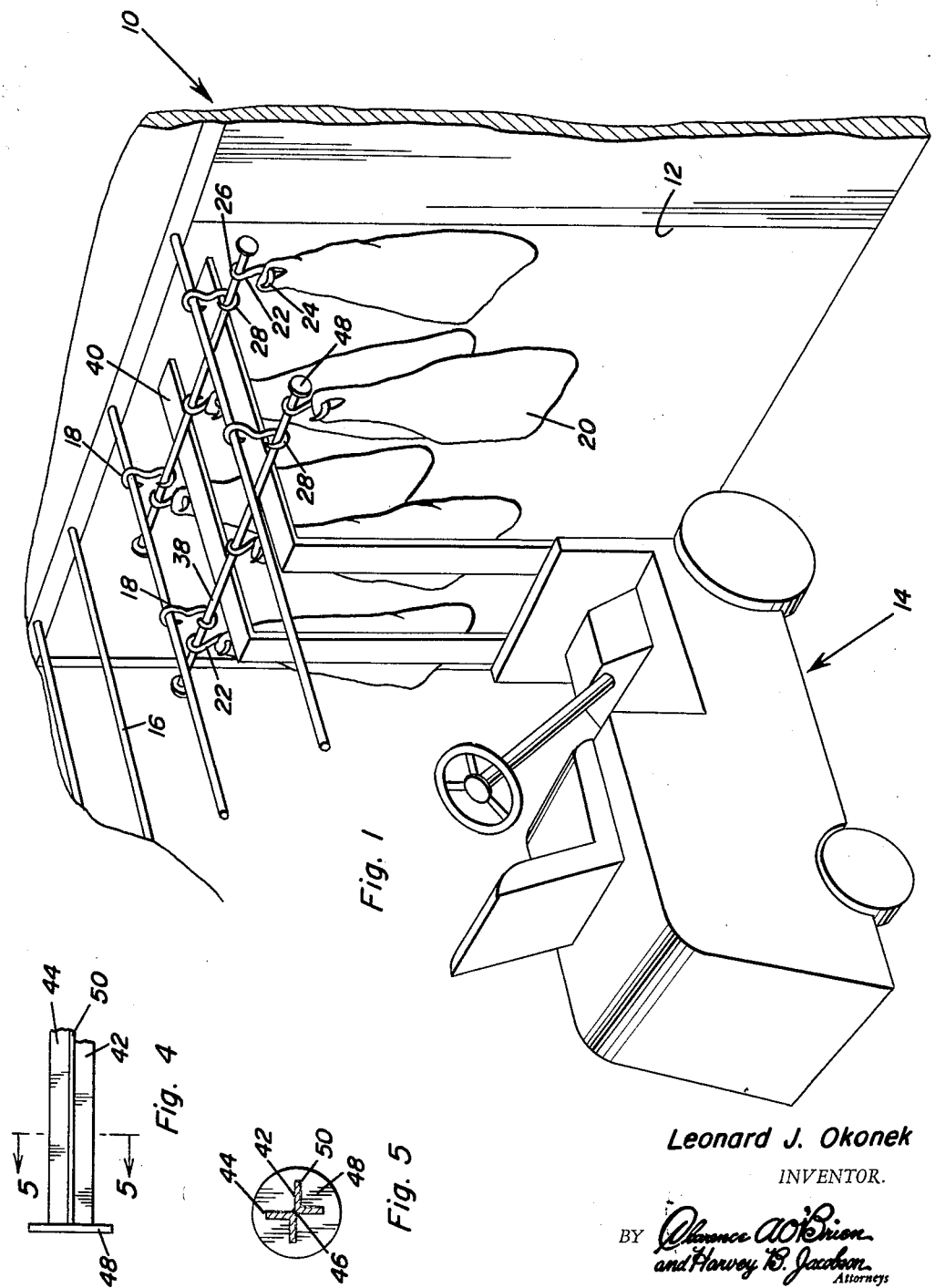
FIGURE 1 is a perspective view illustrating the interior of a semi-trailer load carrying body and illustrating an apparatus for use in carrying out the method of the present invention.

Referring now specifically to the drawings, the numeral 10 generally designates the load carrying body of a semi-trailer or other suitable vehicle which may be insulated, refrigerated or the like. The details of the load carrying body are unimportant except that it does have an opening 12 of sufficient dimension to enable a conventional fork lift truck 14 to proceed therethrough. A plurality of overhead supporting rails 16 are provided in the load carrying body which are equipped with double hook members 18 thereon which would normally support meat carcasses or portions thereof designated by numeral 20. The meat carcasses 20 are normally provided with an S-shaped hook 22 having a lower hook portion 24 engaged with the meat carcass and an upper hook portion 26 which would hook into engagement with the lower hook portion 28 of the double hook 18.

Figure 2:
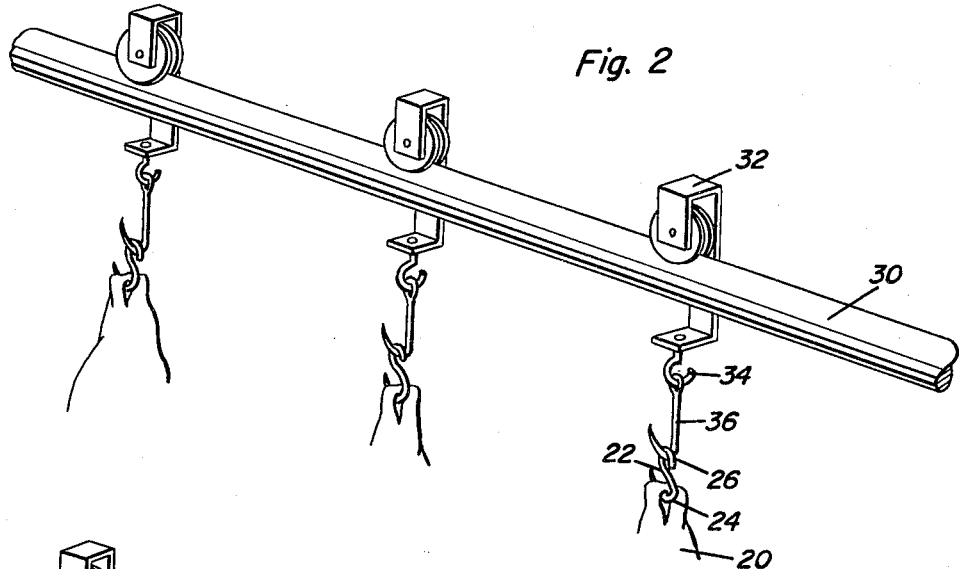
FIGURE 2 is a perspective view of an overhead trolley rail in a warehouse illustrating the manner in which the meat carcasses are conventionally supported therefrom.
Figure 3:
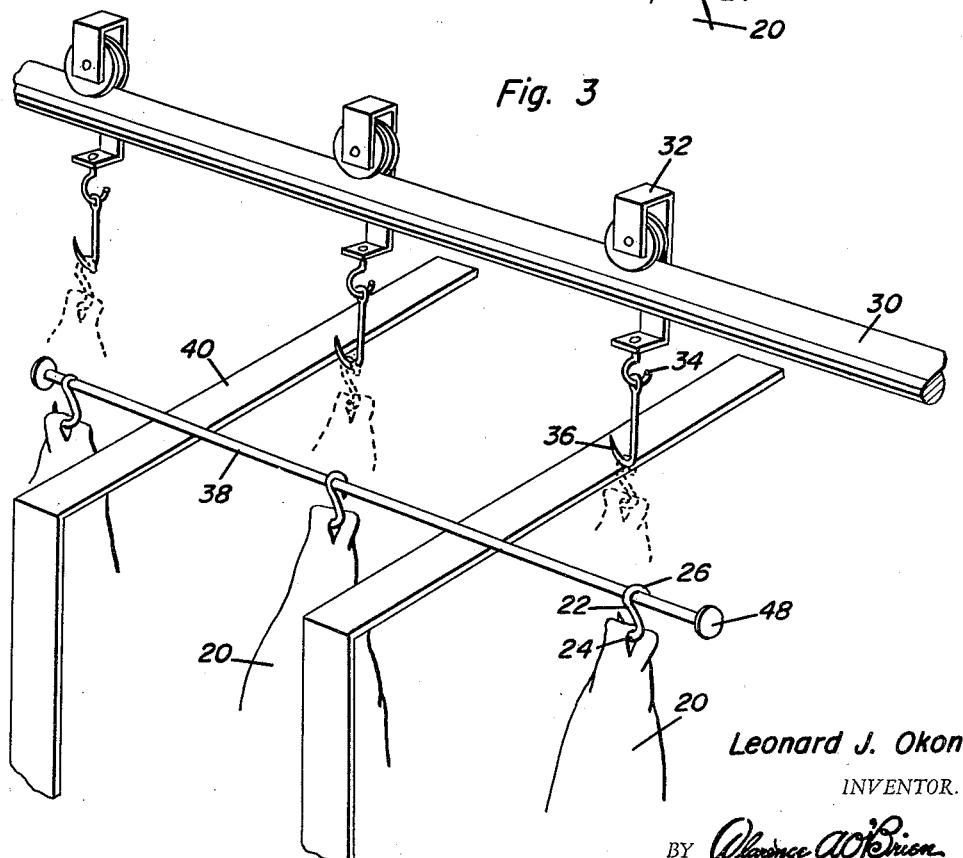
FIGURE 3 is a perspective view of an overhead trolley rail and illustrating the relationship of the apparatus employed in the present invention thereto when being used.

FIGURE 2 illustrates an overhead trolley rail 30 normally provided in a warehouse and the details of this rail are unimportant to the present invention since any conventional overhead trolley rail may be employed. Disposed on the rail 30 is a plurality of trolleys 32 rollingly mounted thereon in a conventional manner and having a depending swivel hook 34 and a pivotal supporting hook 36 which normally engages the upper hook 26 of the S-shaped hook 22 which has the lower hook thereof designated by numeral 24 engaged with the meat carcass 20. Normally, the person handling the carcass 20 has to lift it upwardly to disengage an S-shaped hook 22 from the hook 36 and then have the carcass transported into the interior of the vehicle body 10 and engage the S-shaped hook 22 with the lower hook 28 of the double hook 18. Then when the load carrying body 10 reaches its destination, it is again necessary to lift the carcasses 20 to disengage the S-shaped hook 22 from the double hook 18, transport the carcasses out of the load carrying body and re-engage the S-shaped hooks with the hooks 36 mounted on the overhead trolley rail.

The present method involves the use of an elongated supporting bar or rod 38 which rests on the top surface of a pair of lift forks 40 of the conventional fork lift truck 14. The lift forks 40 are vertically movable by any suitable mechanism provided on the fork lift truck. The support bar or rod is in the form of two elongated right angle members 42 and 44 which are disposed with the apices thereof orientated in abutting relation with the apices being welded together as at 46. The ends of the right angle members 42 and 44 are provided with an enlarged circular washer or disk 48 which also may be conveniently welded thereto. The particular construction of the angle iron members 42 and 44 provides a plurality of spaced supporting edges 50 which will prevent the bar 38 from rolling on the lift forks 40 of the fork lift truck 14 thus retaining the supporting bar 38 in place when it is disposed on the lift forks.

Basically, the method of loading and unloading carcasses from a semi-trailer vehicle load carrying body involves the use of the conventional fork lift truck and a combination of the removable hooks 22 and bars 38. The standard fork lift truck usually includes fork lift members or lift forks 40 which are rotatable 360° for orientating the lift forks in a lower position or in an elevated position. The particular details of the fork lift truck form no part of the present invention except that the lift forks 40 are substantially disposed in horizontal position for maintaining the supporting bars 38 thereon. Also, the semi-trailer load carrying body is of conventional construction and normally is provided with a longitudinal supporting rail running the length of the trailer. The bar 38 is made from welding two thirty-nine inch lengths of one inch angle iron together and welding to the ends of this bar a metal disk or washer having a circumference which is at least one half inch larger than the diameter of the two welded angle irons. The S-shaped hooks 22 are known as off-set meat hooks and a plurality of such hooks are required.

In loading the carcasses into the load carrying body, it is necessary to lay the bars or rods across the forks on the lift truck and the forks are in turn raised up to engage the offset meat hooks 22 which support the carcasses while on the warehouse trolley rail. The lift forks 40 then elevate the bar 38 until the offset meat hooks 22 are disengaged from the hooks 36 which normally support the carcasses from the warehouse trolley and the offset meat hooks are raised sufficiently to disconnect the offset meat hooks from the overhead trolley. This operation is repeated until two or more supporting bars are loaded on the lift fork. The number of supporting bars 38 employed and the number of carcasses supported from each bar is varied depending upon the size of the carcasses involved.

The fork lift truck, now loaded with a plurality of bars 38 and each bar having a plurality of carcasses thereon, is driven into the load carrying body of the semi-trailer which contains the overhead meat rails and one-half of the width of the trailer is loaded. The lift forks containing the carcasses is lifted to the top of the semi-trailer where the supporting bars 38 can be engaged with the double hooks 18 provided on the overhead supporting rail. All of the supporting bars 38 can be removed in one operation. This employs the use of the special double hook adapted to this operation which is substantially a hook which has an offset in the center thereof as illustrated in the drawings. The loading operation is repeated by alternating from one side of the trailer to the other until it has been loaded longitudinally from the front to the rear. Of course, the unloading of the trailer involves the reversal of the above procedure.

The particular construction of the supporting bar not only provides sufficient rigidity but also involves a structure which prevents any rolling of the supporting bar on the forks which would normally occur due to the shifting of the carcasses during driving of the fork lift truck. In certain loading operations, it may be necessary that the fork lift truck move up inclined ramps or down inclined ramps in which event the operator of the fork lift truck should maintain the lift forks in substantially horizontal condition to prohibit any sliding action of the supporting bar on the lift forks. While the dimensions may vary, the dimensions previously mentioned enable three carcasses to be carried on each supporting bar and by employing a plurality of supporting bars for each operation, the time required in loading a vehicle load carrying body may be materially reduced and the physical effort involved in handling meat carcasses may be reduced to an absolute minimum.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. The method of handling meat carcasses comprising the steps of mounting a generally horizontally disposed support bar on the fork lift of a fork lift truck, providing means at the bar to prevent its rotation on the fork lift elevating the bar into engagement with a plurality of meat hooks engaged with overhead supporting hooks, lifting the meat hooks and carcasses along with the bar upwardly for disengaging the meat hooks from the overhead supporting hooks, transporting the bar in a generally horizontal position with the meat carcasses suspended therefrom to a desired location, engaging the support bar with a plurality of overhead hooks and lowering the fork lift for suspending the carcasses from the overhead hooks.

2. The method of handling meat carcasses comprising the steps of elevating a horizontally disposed support bar for engagement with a plurality of meat hooks, lifting the meat hooks upwardly and disengaging them from overhead supporting hooks through the intermediary of the support bar, transporting the horizontal bar while maintaining the horizontal disposition, engaging the horizontal bar with other overhead support hooks, and lowering the horizontal bar into supporting engagement with the other overhead support hooks thereby suspending the meat carcasses therefrom.

References Cited in the file of this patent

UNITED STATES PATENTS

| | | |
|---|---|---|
| 1,944,771 | Webb et al. | Jan. 23, 1934 |
| 2,394,692 | Isler | Feb. 12, 1946 |
| 2,451,226 | Kemp | Oct. 12, 1948 |
| 2,530,704 | Kemp | Nov. 21, 1950 |
| 2,644,598 | Winslow | July 7, 1953 |
| 2,819,683 | Le Fiell | Jan. 14, 1958 |
| 2,840,219 | Mervyn et al. | June 24, 1958 |